United States Patent
Bellis et al.

(10) Patent No.: US 9,506,749 B2
(45) Date of Patent: *Nov. 29, 2016

(54) STRUCTURED LIGHT 3-D MEASUREMENT MODULE AND SYSTEM FOR ILLUMINATING AN AREA-UNDER-TEST USING A FIXED-PATTERN OPTIC

(75) Inventors: Matthew W. Bellis, Lexington, KY (US); Daniel L. Lau, Lexington, KY (US)

(73) Assignee: Seikowave, Inc., Lexington, KY (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/297,233

(22) Filed: Nov. 15, 2011

(65) Prior Publication Data

US 2012/0120412 A1 May 17, 2012

Related U.S. Application Data

(60) Provisional application No. 61/413,963, filed on Nov. 15, 2010.

(51) Int. Cl.
*G01B 11/30* (2006.01)
*G01B 11/25* (2006.01)

(52) U.S. Cl.
CPC ........... *G01B 11/25* (2013.01); *G01B 11/2545* (2013.01)

(58) Field of Classification Search
CPC ............ G06T 7/0057; G01B 11/2513; G01B 11/245; G01B 11/25; G01B 11/2509; G01B 11/2536; G01N 21/95
USPC .......................... 356/601–624, 237.1–237.6, 356/239.7–239.8; 348/49–50; 348/E13.07–E13.075
See application file for complete search history.

(56) References Cited

U.S. PATENT DOCUMENTS 5,633,755 A 5/1997 Manabe et al.
6,874,894 B2 4/2005 Kitamura (Continued)

OTHER PUBLICATIONS

Liu, K., Y. Wang, D. L. Lau, Q. Hao, and L. G. Hassebrook, Dual-frequency pattern scheme for high-speed 3-D shape measurement, vol. 18, No. 5, Optics Express 5229-5244 (Mar. 1, 2010).

(Continued)

*Primary Examiner* — Tri T Ton
(74) *Attorney, Agent, or Firm* — Macheledt Bales LLP

(57) ABSTRACT

A surface measurement module for 3-D triangulation-based image acquisition of a surface-under-inspection and under observation by at least one camera. The module having: (a) a casing housing an optical system comprising a plurality of lens elements positioned between a fixed-pattern optic and a light source; (b) an output of said fixed-pattern optic comprising a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \qquad \text{Eq. (1.1)}$$

(c) a shifting element to spatially shift said output of said fixed-pattern optic during projection onto the surface-under-inspection; and (d) a plurality of images captured of said output of said fixed-pattern optic during projection onto the surface-under-inspection are used for the image acquisition.

20 Claims, 5 Drawing Sheets

(56) References Cited

U.S. PATENT DOCUMENTS

| | | | |
|---|---|---|---|
| 6,977,732 | B2 | 12/2005 | Chen et al. |
| 7,353,954 | B1 | 4/2008 | Malek et al. |
| 7,440,590 | B1 | 10/2008 | Hassebrook et al. |
| 7,456,842 | B2 * | 11/2008 | Kosolapov .................... 345/589 |
| 7,844,079 | B2 | 11/2010 | Hassebrook et al. |
| 8,224,068 | B2 | 7/2012 | Hassebrook et al. |
| 8,723,923 | B2 | 5/2014 | Bloom et al. |
| 2004/0090638 | A1 | 5/2004 | Babayoff et al. |
| 2006/0132802 | A1 * | 6/2006 | Chung et al. ................ 356/603 |
| 2007/0086762 | A1 | 4/2007 | O'Keefe et al. |
| 2010/0195114 | A1 * | 8/2010 | Mitsumoto et al. .......... 356/601 |
| 2010/0222684 | A1 * | 9/2010 | Hatzilias et al. ............. 600/476 |
| 2010/0321773 | A1 | 12/2010 | Chen et al. |
| 2011/0242281 | A1 | 10/2011 | Schmidt |
| 2012/0092463 | A1 * | 4/2012 | Liu et al. ........................ 348/50 |
| 2012/0113229 | A1 | 5/2012 | Hassebrook et al. |
| 2012/0120413 | A1 * | 5/2012 | Bellis et al. .................. 356/603 |

OTHER PUBLICATIONS

Wang, Y, K. Liu, D. L. Lau, and L. G. Hassebrook, Period Coded Phase Measuring Strategy for 3-D Realtime Acquisition and Data Processing, J. Opt. Soc. (2009).

Liu, K., Y. Wang, D. L. Lau, Q. Hao, and L. G. Hassebrook, LUT-based processing for structured light illumination real-time phase and 3-D surface reconstruction, J. Opt. Soc. (2009).

Li, Jielin, Hassebrook, L. G., and Guan, C., "Optimized two-frequency phase-measuringprofilometry light-sensor temporal-noise sensitivity," J. Opt. Soc. Am. A, vol. 20, No. 1, pp. 106-115 (Jan. 2003).

Frisken, S. F., R. N. Perry, A. P. Rockwood, and T. R. Jones, "Adaptively sampled distance fields: A general representation of shape for computer graphics," in Proceedings of the 27th annual conference on Computer graphics and interactive techniques, 249-254 (2000).

* cited by examiner

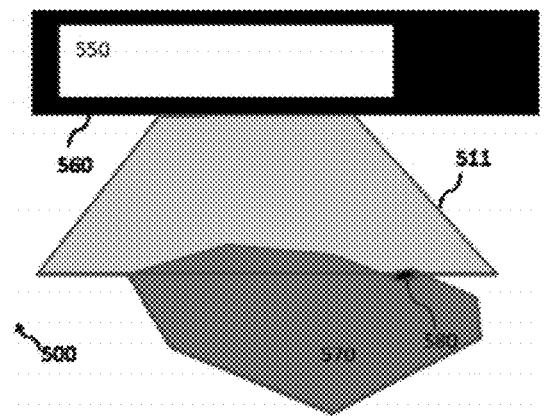
FIG. 5A
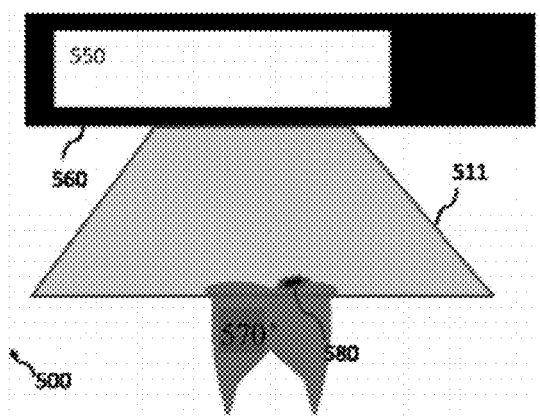
FIG. 5B
FIG. 6
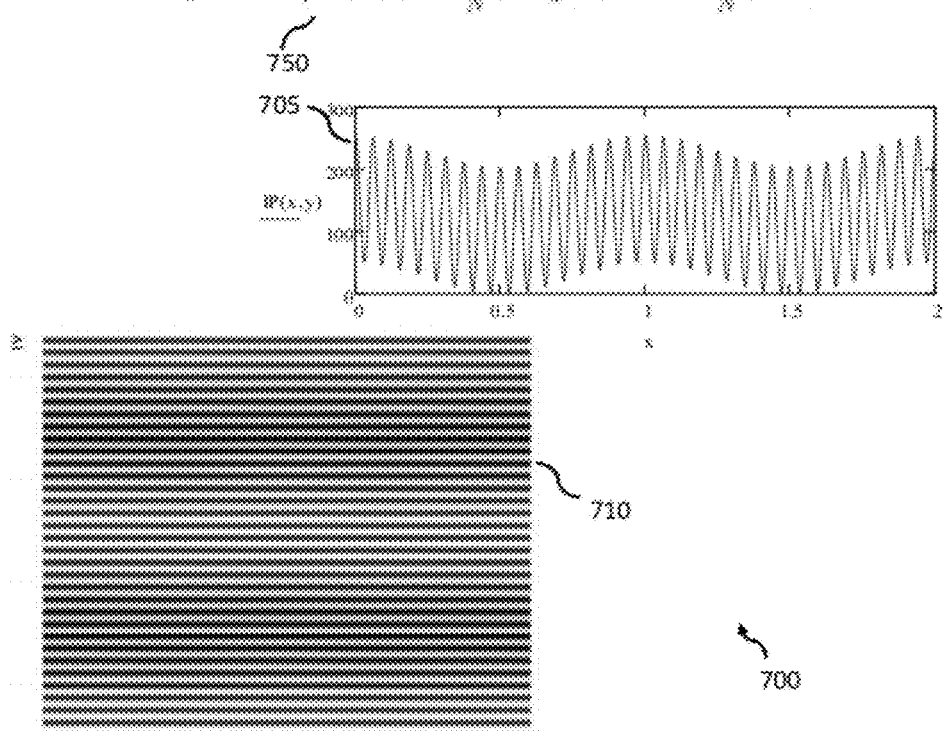

STRUCTURED LIGHT 3-D MEASUREMENT MODULE AND SYSTEM FOR ILLUMINATING AN AREA-UNDER-TEST USING A FIXED-PATTERN OPTIC

CROSS REFERENCE TO RELATED APPLICATIONS

This application claims benefit under 35 U.S.C. 119(e) of U.S. Provisional Application No. 61/413,963 filed 15 Nov. 2010 by the applicants on behalf of the assignee, the complete disclosure of which—including attached materials—is incorporated herein by reference, to the extent the disclosure provides support and further edification hereof.

FIELD OF THE INVENTION

In general, the invention relates to the field of three-dimensional (3-D) measurement of surfaces using structured light illumination (SLI) techniques. Herein, "SLI" is used to represent the terms Structured Light Illumination, or often referred to, simply, as Structured Light. More-particularly, the invention is directed to the use of a new optical technique and system to measure and record the 3-D characteristics of 3-D surfaces by projecting a selected superimposed SLI pattern composed of a plurality of SLI patterns, through a fixed-pattern optic, to illuminate a surface of interest of an area/object-under-test. Furthermore, the invention is directed to a novel intra-oral dental measurement system and a novel head, face, and lung measurement system.

BACKGROUND OF THE INVENTION

Historical Perspective

The object measurement technique referred to as Structured Light (or, SLI) has been in use for measuring the 3-D characteristics of objects for many years. However, current implementations are computationally heavy and available systems have large footprints. Because conventional SLI surface measuring systems employ sophisticated electronically-driven SLI signal processing projection units to project SLI patterns—with each SLI pattern projected requiring a dedicated projector unit—it has been impractical to employ conventional SLI surface measuring systems to perform real-time measurements to monitor surfaces located in relatively small spaces (volumes), such as, surfaces located: inside the mouth or ear of a mammal (intra-oral and intra-aural surfaces), inside machinery (for example, machinery found in manufacturing plants); within a pipeline, and so on. Furthermore, the nature of projecting multiple sophisticated SLI patterns requisite for making 3-D surface measurements—where each conventional SLI pattern projected requires a dedicated projector unit—has further led way from the application of conventional SLI surface measuring systems to make real-time measurements of 3-D surfaces.

Structured Light (i.e., Structured Light Illumination), confocal imaging, time-of-flight, and parallel confocal microscopy are each considered 3-D measurement techniques. SLI is currently used to observe a surface-of-interest by projecting multiple SLI patterns (grid, stripes, ellipical patterns, and so on) with a projector onto a surface-of-interest while measuring, with a camera (lens and processing unit) the image reflected off the surface-of-interest to deduce resultant distortions of the patterns produced on the surface-of-interest. Knowing camera and projector geometry (many conventional techniques exists for such mapping), point-by-point depth information about the surface distortions is calculated by way of triangulation. World coordinates to camera are calculated using conventional well known mapping techniques such as that found at vision.caltech.edu/bouguetj/calib_doc/: "This toolbox works on Matlab 5.x, Matlab 6.x and Matlab 7.x on Windows, Unix and Linux systems and does not require any specific Matlab toolbox (for example, the optimization toolbox is not required)." Using the conventional camera calibration toolbox for Matlab, one computes the necessary coefficients to map world coordinates onto the coordinate system of the camera and the projector. In this manner, a mathematical relationship is defined between the camera (i.e., each individual pixel in the camera), the projector, (i.e., the origin of projected rows of information), and an object-under-test located in an external frame of reference, often referred to as the 'real world' coordinate system.

U.S. Pat. No. 6,788,210 entitled "METHOD AND APPARATUS FOR THREE DIMENSIONAL SURFACE CONTOURING AND RANGING USING A DIGITAL VIDEO PROJECTION SYSTEM," uses a complex series of interconnected dedicated projector units engaged to generate a desired projected multi-pattern image on a surface of interest; FIG. 5 from U.S. Pat. No. 6,788,210 illustrates one conventional optical configuration for a projection system. U.S. Pat. No. 5,633,755 provides additional detail regarding the configuration of an optical system and its electronic control system. U.S. Pat. No. 6,874,894 B2 entitled "DMD EQUIPPED PROJECTOR" details a system known as "Texas Instruments DMD" projector, i.e., the 'DLP device' of a projection apparatus.

As one can appreciate, the system depicted in FIG. 5 from U.S. Pat. No. 6,788,210 and the system depicted in FIG. 5 of U.S. Pat. No. 6,874,894 are structurally and functionally the same. As explained in U.S. Pat. No. 6,788,210, to generate an image, component 46 is used. This component has been labeled 113 in FIG. 6 of U.S. Pat. No. 6,874,894 B2 as PRIOR ART. The Texas Instruments DMD, also known as the DMD or the DLP device, is an complicated semiconductor device, specifically referred to as an optical MEMS device. The DMD is further detailed in Hornbeck, Larry J., "*Digital Light Processing for High-Brightness, High-Resolution Applications,*" SPIE Vol. 3013 pps. 27-40; by way of background only, the content found on the Internet at the domain dlp.com.

U.S. Pat. No. 6,977,732 describes an application of the DMD to measure the three dimensional shape of small objects. As explained therein, additional complex electronic systems are needed to operate the DMD-based projection system: It has an electronic micro-display for three dimensional measurements. Seiko-Epson manufactures liquid crystal devices for projection applications. Sony, Omnivision, and JVC each manufacture liquid crystal on silicon devices for projection applications. Like the DMD, conventional devices are electronically-controlled so that projection of light patterns requires complicated optical control electronics and optics structures.

Computerized Devices, Memory and Storage Devices/Media

I. Digital Computers.

A processor is the set of logic devices/circuitry that responds to and processes instructions to drive a computerized device. The central processing unit (CPU) is considered the computing part of a digital or other type of computerized system. Often referred to simply as a processor, a CPU is made up of the control unit, program sequencer, and an arithmetic logic unit (ALU)—a high-speed circuit that does calculating and comparing. Numbers are transferred from memory into the ALU for calculation, and the results are sent back into memory. Alphanumeric data is sent from memory into the ALU for comparing. The CPUs of a computer may be contained on a single 'chip', often referred to as microprocessors because of their tiny physical size. As is well known, the basic elements of a simple computer include a CPU, clock and main memory; whereas a complete computer system requires the addition of control units, input, output and storage devices, as well as an operating system. The tiny devices referred to as 'microprocessors' typically contain the processing components of a CPU as integrated circuitry, along with associated bus interface. A microcontroller typically incorporates one or more microprocessor, memory, and I/O circuits as an integrated circuit (IC). Computer instruction(s) are used to trigger computations carried out by the CPU.

II. Computer Memory and Computer Readable Storage.

While the word 'memory' has historically referred to that which is stored temporarily, with storage traditionally used to refer to a semi-permanent or permanent holding place for digital data—such as that entered by a user for holding long term—however, the definitions of these terms have blurred. A non-exhaustive listing of well known computer readable storage device technologies compatible with a variety of computer processing structures are categorized here for reference: (1) magetic tape technologies; (2) magnetic disk technologies include floppy disk/diskettes, fixed hard disks (often in desktops, laptops, workstations, host computers and mainframes interconnected to create a 'cloud' environment, etc.), (3) solid-state disk (SSD) technology including DRAM and 'flash memory'; and (4) optical disk technology, including magneto-optical disks, PD, CD-ROM, CD-R, CD-RW, DVD-ROM, DVD-R, DVD-RAM, WORM, OROM, holographic, solid state optical disk technology, etc.

BACKGROUND OF THE INVENTION

Use of Multi-Frequency Patterns

The instant new technique and system disclosed herein, leverage the unique technique disclosed in U.S. Provisional Patent Application 61/371,626, Liu et al., filed 6 Aug. 2010 entitled "Dual frequency Phase Multiplexing (DFPM) and Period Coded Phase Measuring (PCPM) pattern strategies in 3-D structured light systems, and Lookup Table (LUT) based real-time data processing for phase measuring pattern strategies," fully incorporated herein by reference for its technical background discussion. U.S. utility application Ser. No. 13/205,607, Liu et al., filed 8 Aug. 2011 ("Util App '607") was granted priority to U.S. Provisional Patent Application 61/371,626, Liu et al. ("Prov App '626"): the technical disclosures of both Prov App '626 and Util App '607 are hereby fully incorporated herein by reference to the extent consistent with the instant technical specification. While Prov App '626 and Util App '607 were commonly owned upon filing of the latter, neither Prov App '626 or Util App '607 is commonly owned by the assignee of the instant patent application. The unique SLI patterning technique disclosed in Prov App '626 and Util App '607 comprises:

(1) a unique pattern strategy component (further detailed in technical discussions found in Prov App '626 as labeled Section A. "Dual-frequency pattern scheme for high-speed 3-D shape measurement" and as labeled Section B. "Period Coded Phase Measuring Strategy for 3-D Realtime Acquisition and Data Processing"— each of these Sections A. and B. covers an example of a new multi-frequency pattern introduced by way of analogy to the following two traditional electrical circuitry signal/current propagation types: AC, alternating current, and DC, direct current, as further explained below); and (2) a unique de-codification image processing component (further detailed in the technical discussion of Prov App '626 and labeled Section C. "LUT-based processing for structured light illumination real-time phase and 3-D surface reconstruction").

As noted above and detailed further in Prov App '626 and Util App '607, the two examples set forth in Sections A. and B. of the new multi-frequency patterns disclosed in Prov App '626 were introduced in terms of analogies to traditional electrical circuitry signal/current propagation types: An AC flavor and DC flavor. These same Sections A. and B. were integrated into applicants' pending Prov App No. 61/413,963 filed 15 Nov. 2010, incorporated herein by reference as noted above. The multi-frequency pattern detailed in Section A. fashioned after principals governing AC electrical systems was coined "Dual-frequency Phase Multiplexing" (DFPM). As noted in applicants' pending Prov App No. 61/413,963, the material in Section A. was earlier published as 1 Mar. 2010/Vol. 18, No. 5/Optics Express 5233 and is noted in the section of Util App '607 labeled EXAMPLE 01. The multi-frequency pattern detailed in Section B. fashioned after principals governing DC electrical systems was coined "Period Coded Phase Measuring" (PCPM). Dual-frequency Phase Multiplexing (DFPM) patterns comprise two superimposed sinusoids, one a unit-frequency phase sine wave and the other a high-frequency phase sine wave, whereby after receiving/acquiring the pattern data by an image sensor, the phase of the two patterns is separated. The unit-frequency phase is used to unwrap the high-frequency phase. The unwrapped high-frequency phase is then employed for 3-D reconstruction. Period Coded Phase Measuring (PCPM) patterns—fashioned after DC current propagation—are generated with the period information embedded directly into high-frequency base patterns, such that the high-frequency phase can be unwrapped temporally from the PCPM patterns.

As explained in Util App '607—the specification of which is quoted extensively below—using unique multi-frequency patterns, the '607 technique accomplishes:

... 3-D triangulation-based image acquisition of a contoured surface-of-interest (or simply, "contour" or "contour-of-interest") under observation by at least one camera, by projecting onto the surface-of-interest a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \quad \text{Eq. (1.1)}$$

where $I_n^p$ is the intensity of a pixel in the projector for the $n^{th}$ projected image in a particular instant/moment in time (p, to represent projector); K is an integer representing the number of component sinusoids (e.g., K=2 for a dual-frequency sinusoid pattern, K=3 for a triple-frequency sinusoid, and so on), each component sinusoid having a distinct temporal frequency, where $K \leq (N+1)/2$. The parameter $B_k^p$ represents constants that determine the amplitude or signal strength of the component sinusoids; $A^p$ is a scalar constant used to ensure that all values of $I_n^p$ are greater than zero, 0 (that is to say, that the projector unit will not project less than 0 magnitude of light); $f_k$ is the spatial frequency of the $k^{th}$ sinusoid corresponding to temporal frequency k; and $y^p$ represents a spatial coordinate in the projected image. For example, $y^p$ may represent a vertical row coordinate or a horizontal column coordinate of the projected image; n represents phase-shift index or sequence order (e.g., the n=0 pattern is first projected, and then the n=1 pattern, and so on, effectively representing a specific moment in discrete time). N is the total number of phase shifts—i.e., the total number of patterns—that are projected, and for each pattern projected, a corresponding image will be captured by the camera (or rather, the camera's image sensor). When used throughout, the superscript "c" references parameters relating to an image or series of images (video) as captured by the camera, whereas superscript "p" references the projector.

Where pixels are projected to satisfy Eq. 1.1, the pixels of the images then captured by the camera are defined according to the unique technique governed by the expression:

$$I_n^c = A^c + \sum_{k=1}^{K} B_k^c \cos\left(2\pi f_k y^p + \frac{2\pi k n}{N}\right) + \eta \qquad \text{Eq. (1.2)}$$

The term $\eta$ ("eta") represents a noise due to a certain amount of error introduced into the image by the light sensor of the camera. Recall, a camera image is made up of a multitude of pixels, each pixel defined by Eq. 1.2, with values for $A^c$, $B_k^c$, and $\eta^c$ different for each pixel. The "c" superscript indicating a value is dependent on the position of the pixel as referenced in the camera sensor ('camera space'). To obtain phase terms from the pixels projected in accordance with Eq. 1.2, the unique expression, below, is carried-out for each k:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right) \qquad \text{Eq. (1.3)}$$

where, as before, $y^p$ represents a spatial coordinate in the projected image. In EXAMPLE 01, herein below, where K is set equal to 2, the phase terms for the cases where k=1 and k=2 (i.e., for the two superimposed sinusoids) must be determined. FIGS. 8A, 8B are reproductions of computer-generated/implemented images; FIG. 8C is FIG. 8B, enlarged to view representative stripes numbered from the top 1 through 10, by way of example. FIG. 8A is an image representing phase for the k=1 term where f=1 (unit-frequency). FIGS. 8B, 8C are reproductions of an image representing the phase term for k=2 where f=20 (i.e., the high-frequency sinusoid). Note that the stripped pattern in FIG. 5B/C has 20 stripes.

When applying the use of temporal unwrapping techniques, for the case where k=2 using Eq. 1.1, one can determine that the projected pixels will satisfy $$I_n^p = A^p + B_2^p \cos\left(2\pi f_2 y^p + \frac{2\pi 2 n}{N}\right), \qquad \text{Eq. (1.1)}$$
$$k = 2$$

Where this leads to 20 stripes (as shown, for example, in FIG. 8B as a pattern projected on a human hand, the enlargement of which is labeled FIG. 8C to better view stripes), one must determine which of the 20 stripes each particular pixel falls in the projected image (e.g., FIG. 8C). Using a traditional phase unwrapping approach to determine where each pixel fell in the projected image would require a mathematical form of 'stripe counting'—which is computationally quite burdensome.

Rather, according to the instant invention, a second set of patterns (k=1) all unit-frequency sinusoids (i.e., f=1) is superimposed with a high-frequency sinusoid, such as one of 20 stripes, k=2 pattern. The unit-frequency signal is defined by an adaptation of Eq. 1.1

$$I_n^p = A^p + B_1^p \cos\left(2\pi f_1 y^p + \frac{2\pi n}{N}\right), \qquad \text{Eq. (1.1)}$$
$$k = 1$$

Therefore, rather than projecting a total of N patterns onto the contoured surface-of-interest, there are now 2*N patterns projected (such that K=2 and each pixel projected from the projector is comprised of a dual-frequency pattern, one is a unit-frequency sinusoid and the second is a high-frequency sinusoid). However, very unique to the applicants' technique according to the invention, the plurality of pixels projected using Eq. 1.1 are 'instantly decodable' such that the computerized processing unit (CPU) of the computerized device in communication with the projector and camera units, at this point already, has the data and the means to determine (closely enough) which stripe each projected pixel $I_n^p$ is in, while determining $2\pi f_2 y^p$ (i.e., phase) of the camera image (of pixel intensity, $I_n^c$), according to Eq. 1.3—reproduced again, below, for handy reference:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right). \qquad \text{Eq. (1.3)}$$

To carry-out phase unwrapping of the high-frequency sinusoid the following steps can be taken:

$$unitPhase = \arctan\left(\frac{\cos \sum K_1}{\sin \sum K_1}\right)$$

$$highPhase = \arctan\left(\frac{\cos \sum K_2}{\sin \sum K_2}\right) / f_2$$

-continued $$tempPhase = \text{round}\left(\frac{(unitPhase - highPhase)}{(2\pi)f_2}\right)$$

$$finalPhase = tempPhase + highPhase * (2\pi/f_2)$$

Or, summarized in pseudo code short-hand notation as done in FIG. 19, the above computational steps may be rewritten as:
  unitPhase=arctan(cosSumK1/sinSumK1;
  highPhase=arctan(cosSumK2/sinSumK2)/F2;
  tempPhase=round((unitPhase−highPhase)/(2*PI)*F2);
  finalPhase=tempPhase+highPhase*2*PI/F2

The first and second superimposed sinusoid may comprise, for example as noted in EXAMPLE 01, below, a unit-frequency sinusoid (in this context, 'unit' refers to having a magnitude value of 1) superimposed on a high-frequency sinusoid, the unit-frequency sinusoid and high-frequency sinusoid being projected simultaneously (i.e., effectively 'on top of one another' over a selected epoch/duration of frames, n) from a projection unit, or projector, as a plurality of pixels such that each of the pixels projected satisfy the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants set such that the value of $I_n^p$ falls between a target intensity range, (e.g., between 0 and 255 for an 8-bit color depth projector), $f_h$ is the high frequency of the sine wave, $f_u$ is the 'unit' frequency of the sine wave. The unit-frequency signal/sinusoid is used during a demodulation step to produce a decodable, unwrapped-phase term temporally.

Additionally, the process includes a decoding of the projected patterns by carrying-out a lookup table (LUT)-based processing of video image data acquired by at least one image-capture device. The decoding step is performed to extract, real-time, coordinate information about the surface shape-of-interest. The LUT-based processing includes the step of implementing (or, querying) a pre-computed modulation lookup table (MLUT) to obtain a texture map for the contoured surface-of-interest and implementing (or, querying) a pre-computed phase lookup table (PLUT) to obtain corresponding phase for the video image data acquired of the contoured surface-of-interest. Furthermore, use of conventional digital image point clouds can be made to display, real-time, the data acquired.

In one aspect, the unique computer-implemented process, system, and computer-readable storage medium with executable program code and instructions, can be characterized as having two stages. The first being a dual-frequency pattern generation and projection stage, the dual-frequency pattern characterized by the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants that are preferably set, by way of example, to make the value of $I_n^p$ fall between 0 and 255 for an 8-bit color depth projector, $f_h$ is the high frequency of the sine wave, $f_u$ is the unit frequency of the sine wave and equals 1, n represents phase-shift index, and N is the total number of phase shifts and is preferably greater than or equal to 5. The second stage comprises a de-codification stage employing a lookup table (LUT) method for phase, intensity/texture, and depth data.

. . .

By way of using lookup tables (LUT) to obtain modulation (M) and phase (P) according to $$MLUT[U, V] = \frac{1}{3}[3V^2 + U^2]^{0.5} \text{ and}$$

$$PLUT[U, V] = \tan^{-1}\left[\frac{3^{0.5}V}{U}\right].$$

Next, a conversion of phase to X, Y, Z point clouds is implemented using the following:

$$Z^w = M_z(x^c, y^c) + N_z(x^c, y^c)T,$$

$$X^w = E_x(x^c, y^c)Z^w + F_x(x^c, y^c)$$

$$Y^w = E_y(x^c, y^c)Z^w + F_y(x^c, y^c)$$

where $$E_x(x^c, y^c) = \frac{(m_{22}^c m_{33}^c - m_{23}^c m_{32}^c)x^c + (m_{13}^c m_{32}^c - m_{12}^c m_{33}^c)y^c + (m_{12}^c m_{23}^c - m_{13}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

$$F_x(x^c, y^c) = \frac{(m_{22}^c m_{34}^c - m_{24}^c m_{32}^c)x^c + (m_{14}^c m_{32}^c - m_{12}^c m_{34}^c)y^c + (m_{12}^c m_{24}^c - m_{14}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

$$E_y(x^c, y^c) = \frac{(m_{23}^c m_{31}^c - m_{21}^c m_{33}^c)x^c + (m_{11}^c m_{33}^c - m_{13}^c m_{31}^c)y^c + (m_{13}^c m_{21}^c - m_{11}^c m_{23}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}, \text{ and}$$

$$F_y(x^c, y^c) = \frac{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}.$$

Implementing the 7 parameters $M_z$, $N_z$, C, $E_x$, $E_y$, $F_x$, and $F_y$ by means of table look-up for indices ($x^c$,$y^c$) (camera column and row indices), reduces the total computational complexity associated with deriving the 3-D point cloud from the phase term to 7 look-ups, 4 additions, 3—end quoted text from Util App '607—

The flow diagram FIG. 19 from Util App '607 summarizes Liu et al's technique 200 as quoted extensively immediately above. By way of example, the diagram FIG. 19 is incorporated herein and added and made part of the instant disclosure as FIG. 11; the technique of Liu et al. referenced at 1100 as PRIOR ART.

The pixel intensity profile pattern 710, FIG. 6 fixed into the fixed-patterned optic 430 (FIG. 4) can be comprised of two sinusoids at least one of which is a unit-frequency sinusoid (i.e., having a magnitude value of 1) superimposed onto a high-frequency sinusoid, such that the unit-frequency sinusoid and high-frequency sinusoid are projected simultaneously over a selected epoch/duration of frames, n, such that each of the pixels projected satisfy the expression 750, FIG. 6, noted below. The expression, below, is the same as that referred to as prior art eqn. (8) in Section A. of applicants' Prov App No. 61/413,963 and in Section A. of Prov App '626, as well as further explained in EXAMPLE 01 of Util App '607:

$$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants set such that the value of $I_n^p$ falls between a target intensity range, (e.g., between 0 and 255 for an 8-bit color depth projector), $f_h$ is the high frequency of the sine wave, $f_u$ is the 'unit' frequency of the sine wave. The unit-frequency signal/sinusoid is used during a demodulation step to produce a decodable, unwrapped-phase term temporally. Preferably, pixel intensity profile pattern 710 is 'fixed' into a transparent lens member, by way of etching into, depositing onto, or otherwise 'fixing' into the lens member, causing light entering the patterned optic 430, to exit as pattern light output 435, FIG. 4 having the pixel intensity profile pattern 710, FIG. 6.

The unique compact measurement apparatus and system adapted to make high-resolution measurements in real-time, leverage off the SLI patterning technique detailed further in Prov App '626 and Util App '607 resulting in a unique.

SUMMARY OF THE INVENTION

One will appreciate the distinguishable features of the system and associated technique described herein from those of known 3-D shape recognition techniques, including any prior designs invented by one or more of the applicants hereof. Certain of the unique features, and further unique combinations of features—as supported and contemplated herein—may provide one or more of a variety of advantages, among which include: (a) ready integration and flexibility/versatility (i.e., use in a wide variety of environments to gather 3-D surface data about a multitude of different areas/subjects/objects-under-test); (b) single 'snap-shot' investigation of an area/subject/object-under-test and/or provide ongoing monitoring/investigation of an area/subject/object without disruption of the surface environment around the area/object/subject; and/or (c) speed of measurements and real-time results, particularly useful to minimize artifacts that may result from motion of an object or subject (e.g., mammal) that is in motion when surface data is measured.

BRIEF DESCRIPTION OF DRAWINGS

For purposes of illustrating the innovative nature plus the flexibility of design and versatility of the new system and associated technique, as customary, figures are included. One can readily appreciate the advantages as well as novel features that distinguish the instant invention from conventional computer-implemented tools/techniques. The figures as well as any incorporated technical materials have been included to communicate the features of applicants' innovation by way of example, only, and are in no way intended to limit the disclosure hereof.

FIG. 5A A high-level block diagram schematically illustrating a Measurement module 550 in operation measuring an Area-under-inspection 511 within which an Object-under-test 570 (having a defect 580) is being investigated by the Measurement module 550.

FIG. 5B A second embodiment of the Measurement module 550 wherein the Object-under-test 570' is a mammalian tooth-shape having a defect 580, such as a small area of decay.

FIG. 6 Graphical representations of a Profile pixel intensity pattern 710 and base pattern intensity shown as a function of position profile 705, along with an expression 750 governing base intensity pattern as a function of position.

FIG. 9 is a high-level block diagram schematically illustrating an alternative Projection system architecture 900 of the invention.

FIG. 10 is a high-level block diagram schematically illustrating another alternative projection system architecture 1000 of the invention.

DESCRIPTION DETAILING FEATURES OF THE INVENTION

Figure 1:
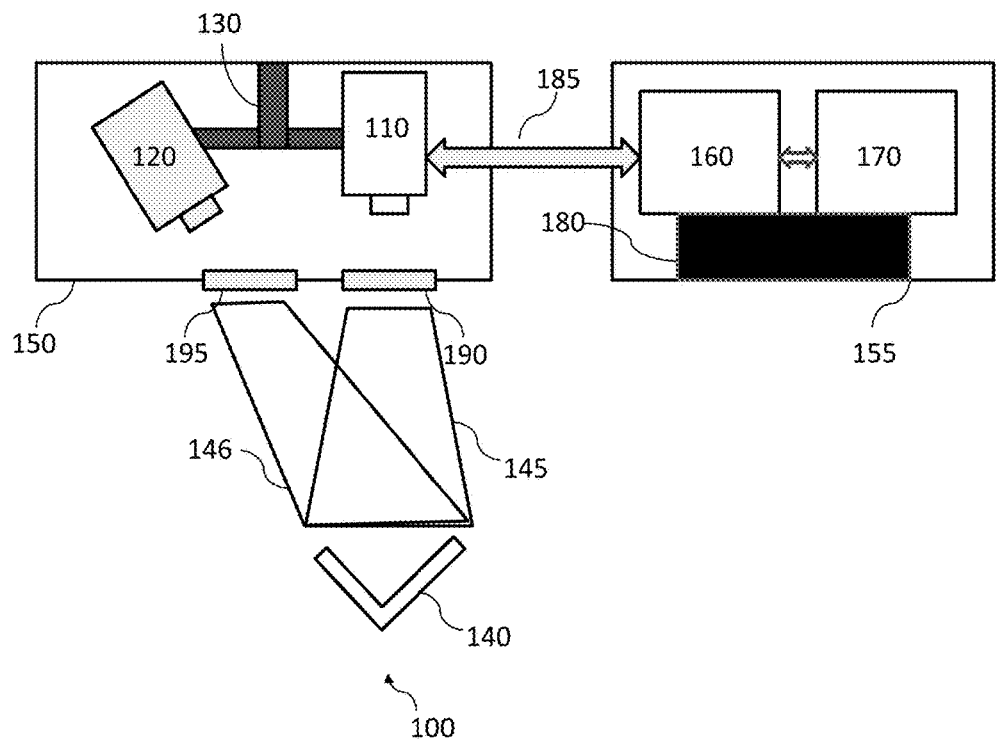
FIG. 1 A high-level block diagram schematically illustrating a Measurement module 100 having Measurement module case/housing 150 enclosing a Projection system 110 and single camera system 120, in communication with a System controller and data storage case/housing 155 enclosing a System controller 160 and Data storage 170.

By viewing the figures, the technical reference materials incorporated by reference herein, one can further appreciate the unique nature of core as well as additional and alternative features of the new apparatus/module and associated system disclosed herein. Back-and-forth reference and association has been made to various features and components represented by, or identified in, the figures. While "FIG. 1" may be interchangeably referred to as "FIG. 1", as used throughout, either is intended to reference the same figure, i.e., the figure labeled FIG. 1 in the set of figures.

Below is a list of components/features/assemblies shown and labeled throughout FIGS. 1-5A, and 6 matching reference numeral with a respective description selected for each component/feature/assembly depicted:

REFERENCE NUMERAL

Component/Feature Description

- 100 Measurement module
- 110 Projection system
- 120 Single camera system
- 130 Measurement module mechanical mount
- 140 Calibration fixture
- 145 Projector illumination area
- 146 Camera field of view
- 150 Measurement module case
- 155 System controller and data storage case
- 160 System controller
- 170 Data storage
- 180 System controller and data storage mechanical mount
- 185 Control and data bus
- 190 Projector aperture
- 195 Camera aperture
- 200 Alternative measurement module
- 210 Projection system
- 220 First camera system
- 221 Second camera system
- 230 Measurement module mechanical mount
- 240 Calibration fixture
- 245 Projector illumination area
- 246 First camera field of view
- 247 Second camera field of view
- 250 Measurement module case
- 255 System controller and data storage case
- 260 System controller
- 270 Data storage
- 280 System controller and data storage mechanical mount
- 285 Control and data bus
- 290 Projector aperture
- 295 First camera aperture
- 296 Second camera aperture
- 300 Camera system architecture
- 310 Image sensor
- 320 Camera lens
- 321 Camera lens elements
- 330 Camera pixel data output format
- 350 Camera power unit
- 360 Camera mechanical frame
- 365 Camera pixel data output bus
- 370 Camera pixel data processing device
- 400 Projection system architecture
- 410 Light source (source of illumination)
- 415 Light output from light source
- 420 Illumination optical system
- 421 Illumination system lens element
- 422 a second illumination system lens element
- 425 Light output from light source shaped by upstream illumination system 420
- 430 Fixed-pattern optic structure (transparent support and etched-pattern layer)
- 431 Optic shifting element (shifts, or reorients, fixed-pattern optic structure 430)
- 435 Patterned light output
- 440 Projection optical system
- 441 Projection system lens element
- 442 a second projection system lens element
- 450 Projector power unit
- 500 Object/subject-under-test measurement system (FIGS. 5A, 5B)
- 511 Area-under-inspection
- 550 Measurement module
- 560 Carrier/housing for measurement module
- 570 Object-under-test (FIG. 5A, general case, FIG. 5B, mammalian tooth at 570', etc.)
- 580 Defect on object-under-test
- 700 Patterned optic implementation
- 705 Base pattern intensity versus position profile
- 710 Profile intensity pattern
- 750 Equation for base intensity pattern vs. position (Eqn (8))

One aspect of the invention includes a compact system 400 (alternatively, 900 or 1000) employing: a light source 410, 910, 1010; an Illumination optical system 420, 920, 1020 (comprising a plurality of lens elements) in front of a unique fixed-pattern optic 430, 930, 1030 from which a superimposed/overlaid SLI pattern (composed of a plurality of SLI patterns) is output 435, 935, 1035 to illuminate a surface of a 3-D object/subject-under-test (e.g., 570) or area-under-inspection (e.g., 511), as the case may be; and a Projection optical system 440, 940, 1040 (comprising a plurality of lens elements downstream of fixed-pattern optic 430, 930; 1030). A second related aspect of the invention includes a method that eliminates the need for complex traditional phase unwrapping algorithms for 3-D measurements based on SLI; the method incorporates operation of the unique fixed-pattern optic 430, 910, 1010 from which a superimposed/overlaid SLI pattern (composed of a plurality of SLI patterns) is output 435, 935, 1035 to illuminate a surface of a 3-D object/subject-under-test (e.g., 570, 570') or area-under-inspection (e.g., 511), as the case may be. SLI 'phase unwrapping algorithms' are traditionally required and used to enable positioning of precise measurements within a larger field of view.

As noted above and detailed further in Prov App '626 and Util App '607, the two examples set forth in Sections A. and B. of the new multi-frequency patterns disclosed in Prov App '626 were introduced in terms of analogies to traditional electrical circuitry signal/current propagation types: An AC flavor and DC flavor. These same Sections A. and B. were integrated into applicants' pending Prov App No. 61/413,963 filed 15 Nov. 2010, incorporated herein by reference as noted above. The multi-frequency pattern detailed in Section A. fashioned after principals governing AC electrical systems was coined "Dual-frequency Phase Multiplexing" (DFPM). As noted in applicants' pending Prov App No. 61/413,963, the material in Section A. was earlier published as 1 Mar. 2010/Vol. 18, No. 5/Optics Express 5233 and is noted in the section of Util App '607 labeled EXAMPLE 01. The multi-frequency pattern detailed in Section B. fashioned after principals governing DC electrical systems was coined "Period Coded Phase Measuring" (PCPM). Dual-frequency Phase Multiplexing (DFPM) patterns comprise two superimposed sinusoids, one a unit-frequency phase sine wave and the other a high-frequency phase sine wave, whereby after receiving/acquiring the pattern data by an image sensor, the phase of the two patterns is separated. The unit-frequency phase is used to unwrap the high-frequency phase. The unwrapped high-frequency phase is then employed for 3-D reconstruction. Period Coded Phase Measuring (PCPM) patterns—fashioned after DC current propagation—are generated with the period information embedded directly into high-frequency base patterns, such that the high-frequency phase can be unwrapped temporally from the PCPM patterns.

The module and system of the invention employs a fixed-pattern optic 430, 930, 1030 that has multiple sine wave patterns overlaid, i.e., superimposed, into a resultant SLI pattern such as is described in Section A and Section B, of applicants' pending Prov App No. 61/413,963. And more-particularly, the fixed-pattern optic is preferably adapted to project—as detailed above and in Util App '607 and represented at 1100 in FIG. 11—a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \qquad \text{Eq. (1.1)}$$

where $I_n^p$ is the intensity of a pixel in the projector for the $n^{th}$ projected image in a particular instant/moment in time (p, to represent projector); K is an integer representing the number of component sinusoids (e.g., K=2 for a dual-frequency sinusoid pattern, K=3 for a triple-frequency sinusoid, and so on), each component sinusoid having a distinct temporal frequency, where K≤(N+1)/2.

Where pixels are projected to satisfy Eq. 1.1, the pixels of the images then captured by the camera are defined according to the unique technique governed by the expression:

$$I_n^c = A^c + \sum_{k=1}^{K} B_k^c \cos\left(2\pi f_k y^p + \frac{2\pi k n}{N}\right) + \eta \qquad \text{Eq. (1.2)}$$

The term η ("eta") represents a noise due to a certain amount of error introduced into the image by the light sensor of the camera. To obtain phase terms from the pixels projected in accordance with Eq. 1.2, the unique expression, below, is carried-out for each k:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right) \qquad \text{Eq. (1.3)}$$

where, as before, $y^p$ represents a spatial coordinate in the projected image.

When applying the use of temporal unwrapping techniques, for the case where k=2 using Eq. 1.1, one can determine that the projected pixels will satisfy $$I_n^p = A^p + B_2^p \cos\left(2\pi f_2 y^p + \frac{2\pi 2 n}{N}\right), k = 2 \qquad \text{Eq. (1.1)}$$

A second set of patterns (k=1) all unit-frequency sinusoids (i.e., f=1) is superimposed with a high-frequency sinusoid, such as one of 20 stripes, k=2 pattern. The unit-frequency signal is defined by an adaptation of Eq. 1.1

$$I_n^p = A^p + B_2^p \cos\left(2\pi f_1 y^p + \frac{2\pi n}{N}\right), k = 1 \qquad \text{Eq. (1.1)}$$

Therefore, rather than projecting a total of N patterns onto the contoured surface-of-interest, there are now 2*N patterns projected (such that K=2 and each pixel projected from the projector is comprised of a dual-frequency pattern, one is a unit-frequency sinusoid and the second is a high-frequency sinusoid).

To carry-out phase unwrapping of the high-frequency sinusoid the following steps can be taken:

$$unitPhase = \arctan\left(\frac{\cos\sum K_1}{\sin\sum K_1}\right)$$

$$highPhase = \arctan\left(\frac{\cos\sum K_2}{\sin\sum K_2}\right) / f_2$$

$$tempPhase = \text{round}\left(\frac{(unitPhase - highPhase)}{(2\pi)f_2}\right)$$

$$finalPhase = tempPhase + highPhase * (2\pi / f_2)$$

Or, summarized in pseudo code short-hand notation as done in FIG. 19, the above computational steps may be rewritten as:

unitPhase=arctan(cosSumK1/sinSumK1);
highPhase=arctan(cosSumK1(2/sinSumK2)/F2;
tempPhase=round((unitPhase−highPhase)/(2*PI)*F2);
finalPhase=tempPhase+highPhase*2*PI/F2

The first and second superimposed sinusoid may comprise, for example, a unit-frequency sinusoid (having a magnitude value of 1) superimposed on a high-frequency sinusoid, the unit-frequency sinusoid and high-frequency sinusoid being projected simultaneously over a selected epoch/duration of frames, n, as a plurality of pixels such that each of the pixels projected satisfy the expression 750, FIG. 6, below $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants set such that the value of $I_n^p$ falls between a target intensity range, (e.g., between 0 and 255 for an 8-bit color depth projector), $f_h$ is the high frequency of the sine wave, $f_u$ is the 'unit' frequency of the sine wave. The unit-frequency signal/sinusoid is used during a demodulation step to produce a decodable, unwrapped-phase term temporally.

Additionally, the process includes a decoding of the projected patterns by carrying-out a lookup table (LUT)-based processing of video image data acquired by at least one image-capture device. The decoding step is performed to extract, real-time, coordinate information about the surface shape-of-interest. The LUT-based processing includes the step of implementing (or, querying) a pre-computed modulation lookup table (MLUT) to obtain a texture map for the contoured surface-of-interest and implementing (or, querying) a pre-computed phase lookup table (PLUT) to obtain corresponding phase for the video image data acquired of the contoured surface-of-interest. Furthermore, use of conventional digital image point clouds can be made to display, real-time, the data acquired.

Figure 11:
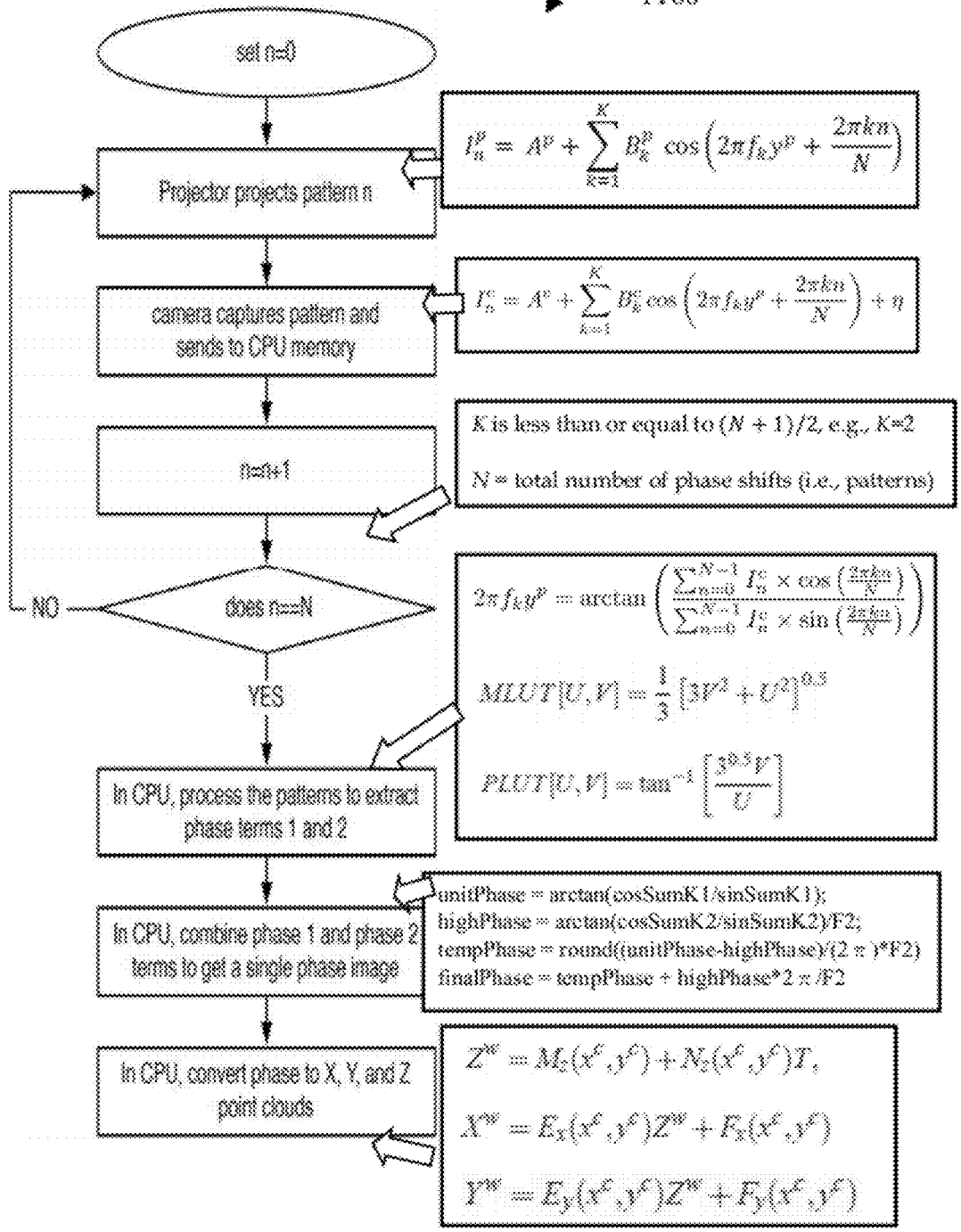
FIG. 11 A high level flow diagram (labeled PRIOR ART) depicting the unique technique 1100—disclosed in Prov App '626 and Util App '607—leveraged by the compact measurement apparatus and system of the invention.

Therefore, the fixed-pattern optic may be adapted to project—as detailed and represented in FIG. 6 and further shown at 1100 in FIG. 11—a multi-frequency pattern characterized as having two stages. The first being a dual-frequency pattern generation and projection stage, the dual-frequency pattern characterized by the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants that are preferably set, by way of example, to make the value of $I_n^p$ fall between 0 and 255 for an 8-bit color depth projector, $f_h$ is the high frequency of the sine wave, $f_u$ is the unit frequency of the sine wave and equals 1, n represents phase-shift index, and N is the total number of phase shifts and is preferably greater than or equal to 5. The second stage comprises a de-codification stage employing a lookup table (LUT) method for phase, intensity/texture, and depth data. By way of using lookup tables (LUT) to obtain modulation (M) and phase (P) according to $$MLUT[U, V] = \frac{1}{3}[3V^2 + U^2]^{0.5} \text{ and}$$

$$PLUT[U, V] = \tan^{-1}\left[\frac{3^{0.5}V}{U}\right].$$

Thereafter, a conversion of phase to X, Y, Z point clouds is implemented using the expressions:

$$Z^w = M_z(x^c, y^c) + N_z(x^c, y^c)T,$$

$$X^w = E_x(x^c, y^c)Z^w + F_x(x^c, y^c)$$

$$Y^w = E_y(x^c, y^c)Z^w + F_y(x^c, y^c)$$

Further details concerning solutions and use of the three expressions above can be found elsewhere herein and in Util App '607.

Figure 4:
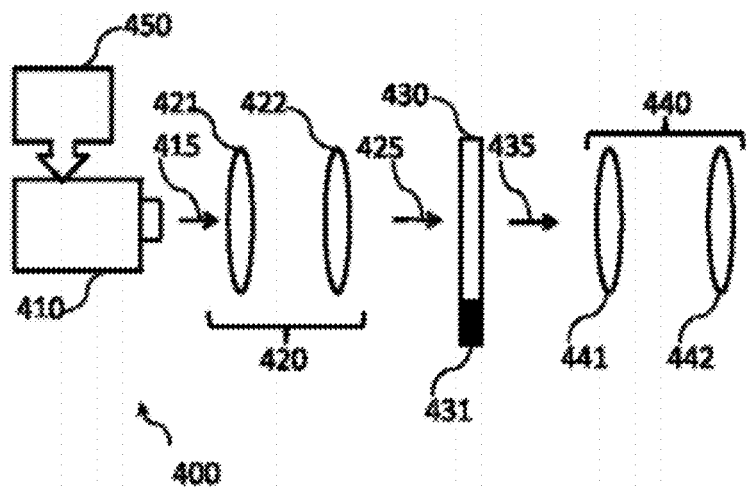
FIG. 4 A high-level block diagram schematically illustrating the Projection system architecture 400 having a Light source 410, optical system 420, Fixed-pattern optic 430 in communication with an Optic shifting element 431 (for shifting, or reorienting, the fixed-pattern optic structure 430), and Projection optical system 440.
Figure 7:
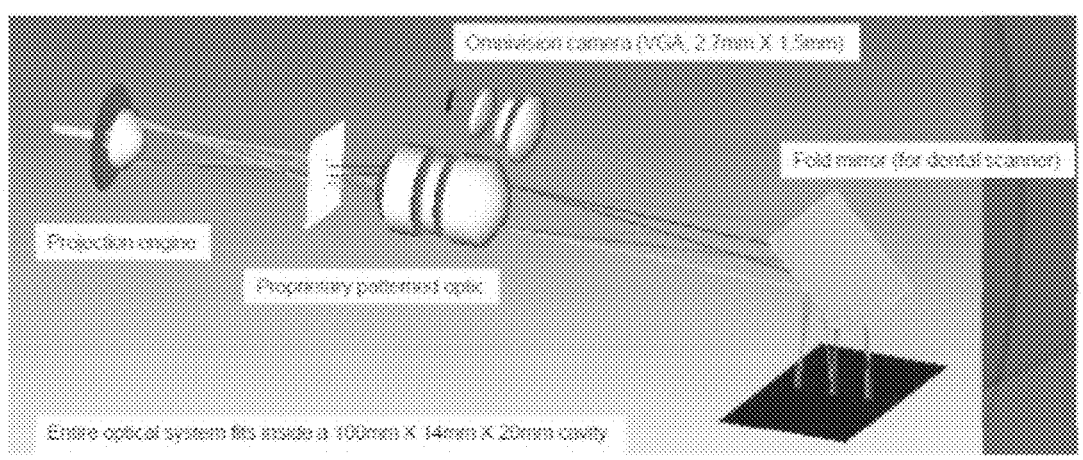
FIG. 7 A diagram illustrating an embodiment of Projection system architecture 400 of FIG. 4.
Figure 9:
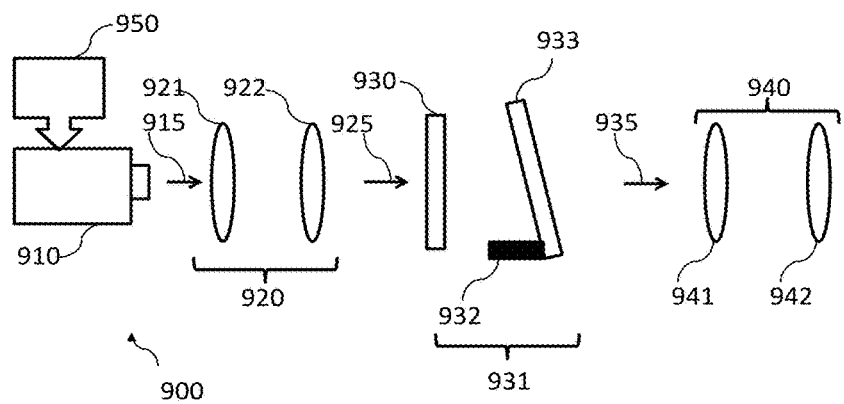
FIG. 9 Depicting certain features akin to those illustrated by the block diagram of FIG. 4.
Figure 10:
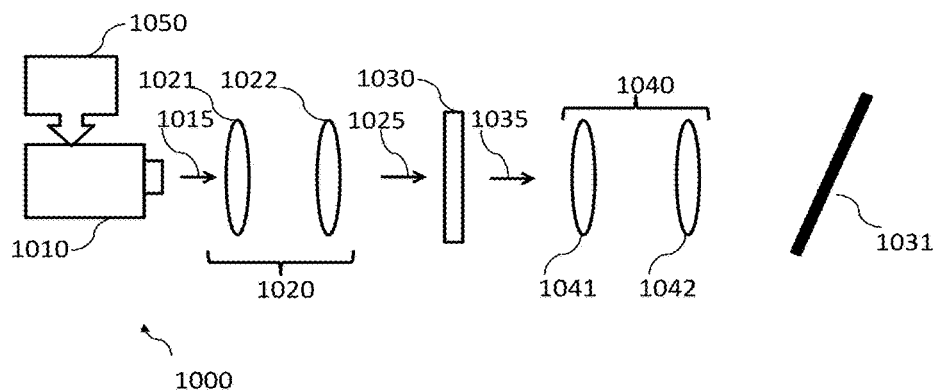
FIG. 10 Depicting certain features akin to those illustrated by the block diagram of FIG. 4.

Expression 750, FIG. 6, defines a profile pattern of pixel intensity (710) for use with the fixed-patterned optic 430, 930, 1030 (FIGS. 4, 9 and 10, respectively). Preferably, pixel intensity profile pattern 710 is 'fixed' into a transparent lens member, by way of etching into, depositing onto, or otherwise 'fixing' into a transparent lens member, causing light entering the patterned optic 430, 930, 1030, to exit as pattern light output 435, 935, 1035 having the pixel intensity profile pattern 710. As a result, the projected pattern (physically etched or deposited onto a transparent lens member) is comprised of, for example, a high frequency sine wave pattern and a low frequency sinewave pattern (this combination of sine waves is graphically represented at 705, FIG. 6). The high frequency pattern enables precise measurement of the 3-D shape of objects. The low frequency pattern enables course measurement of the distance between the object under test and the measurement system. As mentioned elsewhere, this eliminates the conventional employment of additional, sophisticated computer processing required when applying, phase unwrapping algorithms. The low frequency measurement provides a rough (course) estimate of the 3-D coordinates of a measured point. The high frequency measurement precisely locates the point (fine measurement).

FIG. 1 illustrates one embodiment of the Measurement module, 100, having a Projection system 110, a Single camera system 120, a Measurement module mechanical mount and cooling system 130, a Measurement module case 150, a System controller and data storage case 155, a System controller 160, Data storage 170, a System controller and data storage mechanical mount and cooling system 180, a Control and data bus 185, a Projector aperture 190, and a Camera aperture 195.

The Projection system 110 projects a pattern through the Projector aperture 190 that is focused onto the object-under-test 570, 570' (FIGS. 5A and 5B) and creates a Projector illumination area 145. The pattern is distorted by the shape of the object according to the object's 3-D characteristics. Provided the distorted pattern is within the Camera field of view 146, the distortions are recorded by the Single camera system 120 which observes the object under test through the Camera aperture 195. Only portions of the object under test within the Projector illumination area 145 and within the Camera field of view 146 can be measured. The Projection system 110 and the Single camera system 120 are held in place with an assembly labeled 130 which uniquely incorporates within Measurement module 100 the functionalities of Measurement module mechanical mount and cooling system. In order to ensure suitably accurate 3-D measurements, a Calibration fixture 140 is used to precisely establish the relative physical positions of the Projection system 110 and the Single camera system 120. Since the physical shape of the Measurement module mechanical mount and cooling system, 130, will change a result of environmental conditions (i.e., physical dimensions of 130 will expand and contract slightly with temperature changes), a pre-calibration of the Measurement module 100 using the Calibration fixture 140 is done over a wide range of environmental conditions. Pre-calibration is preferably done under controlled environment, prior to monitoring of an object-under-test 570, 570'.

For example, a temperature range from 0 C. to 40 C. might be used during pre-calibration of the Measurement module 100. Calibration data, along with measurement results, are stored in Data storage 170 by the System controller 160. Data and control information are passed between the Projection system 110, the Single camera 120 and the System controller 160 via the Control and data bus 185. The System controller and data storage case 155 maintains the System controller 160 and the Data storage 170 within their respective operating temperature ranges. The Measurement module case 150, along with the Measurement module mechanical mount and cooling system 130, aids in maintaining the Projection system 110 and the Single camera system 120 within respective target operating temperature ranges.

Figure 2:
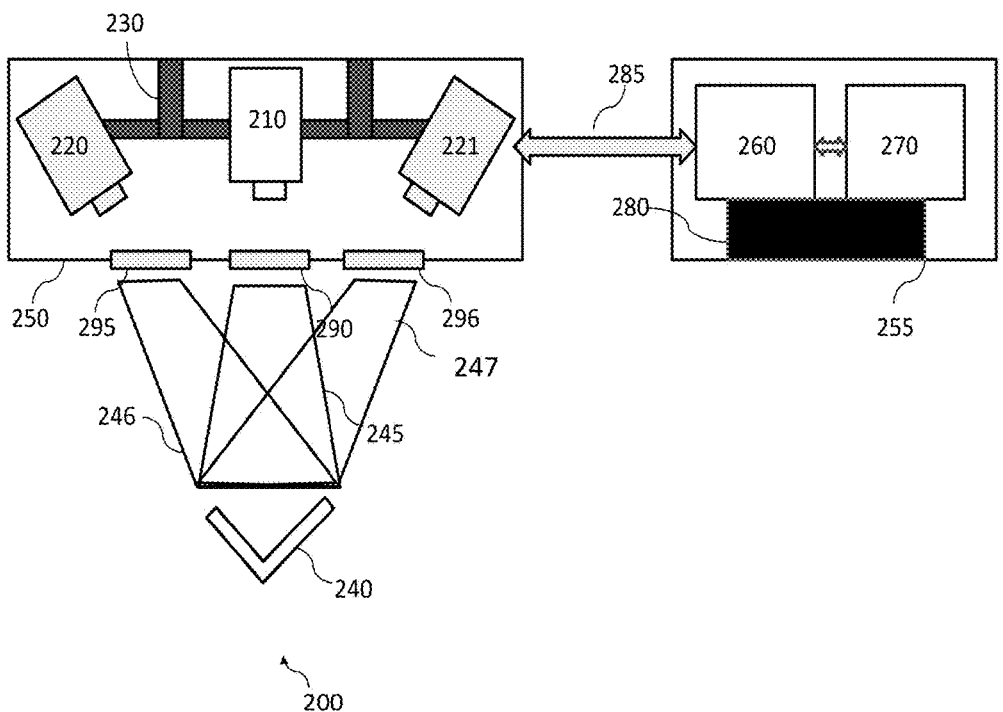
FIG. 2 A high-level schematic illustrating a second, alternative Measurement module 200 in communication with a case/housing 255 enclosing a System controller 260 and the Data storage 270.
Figure 3:
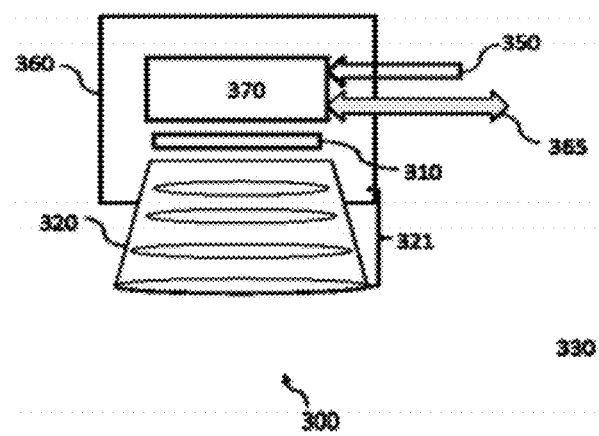
FIG. 3 A high-level block diagram schematically illustrating a Camera system 300 for capturing an image of the illuminated Object/subject-under-test 570, FIGS. 5A and 5B. Camera system 300 has an Image sensor 310, Camera lens 320 comprising Camera lens elements (generally labeled 321), Camera pixel data processing device 370, Camera pixel data output bus 365, and means for connection to Camera power 350.

An alternative preferred embodiment is shown in FIG. 2. In this embodiment, the Projection system 210 projects a pattern through the Projector aperture 190 that is focused onto the object-under-test (e.g., at 570, 570' FIGS. 5A and 5B) producing a Projector illumination area defined at 245. The resultant pattern illuminating an object-under-test (570, 570' FIGS. 5A, 5B) becomes distorted by the shape of the object according to the object's 3-D surface characteristics. Provided the distorted pattern is within a composite Camera field of view 246 of the First and Second Camera Systems 220 and 221, the distortions are recorded by the Camera systems 220, 221. Only portions of the object-under-test within the Projector illumination area defined at 245 and, at the same time, within the composite Camera field of view 246 will be measured. The Projection system 210 and Single camera system 220 are held in place using the Measurement module mechanical mount and cooling system 230. In order to ensure accurate 3-D measurements, a Calibration fixture 240 is used to precisely establish relative physical positions of (or, relative distances between) the Projection system 210 and First Camera System 220 and the projection system 210 and Second Camera System 221. Because the Measurement module mechanical mount and cooling system 230 will change shape (even if only a slight difference in original dimensions) as a result of environmental conditions, a calibration of the Measurement module 200 using the Calibration fixture 240 is done over a wide range of environmental conditions prior to placing the Measurement module in operation.

For example, a temperature range from 0 C. to 40 C. might be used during calibration of the Measurement module 200. Calibration data, along with measurement results, are stored in Data storage 270 by the System controller 260. Data and control information are passed between the Projection system 210, the First Camera System 220, the Second Camera System 221 and the System controller 260 via the Control and data bus 285. The System controller and data storage case 255 maintains the System controller 260 and the Data storage 270 within their respective operating temperatures ranges. The Measurement module case 250 combined with the Measurement module mechanical mount and cooling system 230 maintain the Projection system 210 and the Single camera system 220 within a respective target operating temperature range.

Embodiments of the Projection system 110 (as well as alternative Projection system labeled 210, FIG. 2) are discussed, next, in connection with alternative Projection system architectures 400, 900, 1000 depicted, respectively, in FIGS. 4, 9, and 10 (further discussion of the embodiments depicted in FIGS. 9 and 10 is found under "EXAMPLE-S|alternative useful structures"). Each respective Projection system architecture 400 (900, 1000) includes a Light source 410, 910, 1010 for producing a light emission 415 (915, 1015) incident upon an Illumination optical system 420 (920, 1020) having first and second illumination system lens elements 421, 422 (921, 922 and 1021, 1022) whose output is focused on the Patterned optic 430 (930, 1030) which, in turn, produces the Patterned light output 435 (935, 1035). Patterned light output 435 (935, 1035) is then focused by the Projection optical system 440 (940, 1040) onto the object-under-test (e.g., 570, 570' in FIGS. 5A, 5B).

As depicted in preferred embodiment 400 in FIG. 4, a shifting (or, reorienting) of the 2-D pattern 'fixed' into optic 430, is preferably accomplished by means of a Patterned optic shifting element 431 in communication with the fixed-pattern optic 430 to control movement thereof in a manner that results in a shift, or reorientation, of the pattern (Patterned light output 435) as it illuminates the Object-under-test 570. As depicted in alternative system architecture 900, shifting (or, reorienting) of the 2-D pattern 'fixed' into optic 930 is, likewise, preferably accomplished by Patterned optic shifting element 931 in communication with fixed-pattern optic 930 to control movement thereof. Element 931 comprises a tilted Glass plate 933 rotated through a small range of angles about a pivot point by a Linear translation element 932. And, as depicted in alternative system architecture 1000, the shifting (or, reorienting) of the 2-D pattern 'fixed' into optic 1030 is preferably accomplished by a Patterned optic shifting mirror 1031 for redirecting Patterned light output 1035 prior to illuminating an Object-under-test 570. Returning to FIG. 4: Patterned optic shifting element 431 operates in a unique fashion in concert with fixed-pattern optic 430 to illuminate a fixed point on the Object-under-test 570 with a series of patterns, whereby each pattern is shifted or reoriented; in this manner, a full profilometry measurement can be made of a surface (of interest) of the Object-under-test 570, 570'. As depicted in the schematics of FIGS. 4; 9, and 10, Projector power 450 (950, 1050) supplies power to elements of respective embodiments 400 (900, 1000) of projection system 110, FIG. 1.

Figure 8:
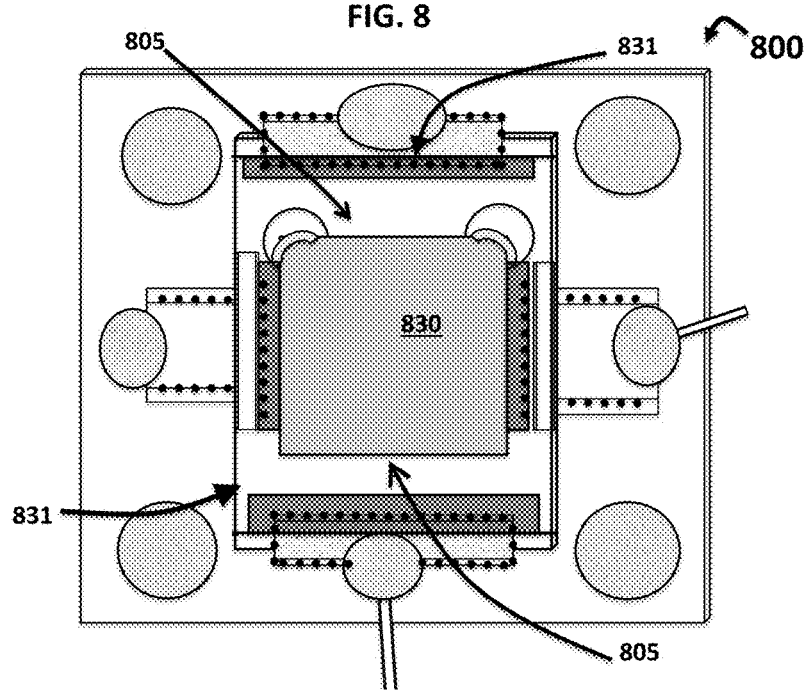
FIG. 8 A top plan view of actuator assembly 800 suitable to carry out mechanical shifting and/or reorientation of the fixed-pattern optic 430, 830, 930, 1030.

The actuator mechanism 831 depicted as part of the assembly shown at 800 in FIG. 8, produces requisite motion to shift the fixed-patterned optic lens element 830. Shifting/moving the fixed-pattern optic causes the projected pattern to shift (or reorient) on the object-under-test, as further explained elsewhere. Mechanical shifting and/or reorientation of the fixed-pattern optic 430 (FIG. 4), 830 (FIG. 8), 930 (FIG. 9), 1030 (FIG. 10) may be accomplished by a variety of suitable actuator means such as that labeled 831. One approach is to use an assembly 800 that combines the patterned optic shifting element 831 (also represented at 431) and the fixed-patterned optic 830 (also represented at 430) as depicted in FIG. 8. As detailed elsewhere herein, the fixed-patterned optic (e.g., 430, FIG. 4 or 830, FIG. 8) is produced by being etched into a silicon membrane that is suitably attached, such as by way of soldered wire(s) 805, to the patterned optic shifting element (e.g., 431, 831). The patterned optic shifting element actuator 831 is composed of a silicon beam structure, shaped, for example, into that of two "H" shapes between which fixed-pattern optic 830 is held/supported. Each H-shaped silicon beam structure is in electrical communication with a metal terminal to which a voltage is applied. The application of a voltage across the silicon beam structure(s) results in a rise in temperature of the beam, resulting in movement of the beam due to the expansion of the material resulting from a temperature change. Because the silicon beam of the patterned optic shifting element actuator 831 (also represented at 431) is attached/connected to the fixed-patterned optic 830 (also represented at 430), the fixed-patterned optic 830 (430) moves as driven by the moving (e.g., oscillating) H-beam structure(s). The motion of the H-beam structure(s) 831, and in turn the fixed-patterned optic 830, is controlled by the applied voltage.

Alternatively, mechanical shifting/movement or reorientation of the fixed-pattern optic 430 (FIG. 4), 830 (FIG. 8), 930 (FIG. 9), 1030 (FIG. 10) may be accomplished by another approach: a linear drive piezo motor as actuator. In this alternative example, Patterned optic shifting element 431 may be an off-the-shelf PILine® linear piezomotor component distributed by Physik Instrumente (PI) GmbH & Co.—further information found at physikinstrumente.com—that uses a rectangular monolithic piezoceramic plate (a stator), segmented on one side by two electrodes. Depending on the desired direction of motion, the left or right electrode of the piezoceramic plate is excited to produce high-frequency eigenmode oscillations of tens to hundreds of kilohertz. An alumina friction tip (pusher) attached to the plate moves along an inclined linear path at the eigenmode frequency.

One embodiment of the Fixed-pattern optic 430 is illustrated in FIG. 6. The graphic representations 700 in FIG. 6 collectively represent one Patterned optic implementation embodiment for fixed-pattern optic 430, 930, 1030. Preferably, as mentioned elsewhere, fixed-pattern optic 430, 930, 1030 is comprised of a glass substrate on which a reflective material is etched, deposited, or otherwise 'fixed' to the glass substrate (transparent lens member), such that the transmittance of light through the patterned optic results in the Profile intensity pattern labeled 710. The Base pattern intensity vs. position profile at 705 is a graphical representation of the Equation for base intensity pattern vs. position 750, identified and further explained elsewhere herein and under Section A. of applicants' Prov App No. 61/413,963, therein identified as eqn. (8).

FIG. 5A, as well as an application-specific embodiment represented in FIG. 5B, illustrates an implementation embodiment 500 of a Measurement Module 100, 200 in operation while taking a measurement of an Object-under-test 570, 570' (the latter in the shape of a mammal tooth). As represented, a Measurement Module 550 (e.g., either 100 or 200) is located within structurally suitable Carrier/housing 560 sized to fit within an intended area of operation (within a mammalian mouth, intra-aural use, etc.). The Measurement module 550 measures an Area-under-inspection 511, as shown in FIGS. 5A and 5B. An Object-under-test 570 is within the Area-under-inspection 511. The Object-under-test 570 is first illuminated with the Profile intensity pattern 710. Once the camera system (for example, that shown as 300 in FIG. 3), has captured an image of an Object-under-test 570 undergoing illumination with Profile intensity pattern 710, the Patterned optic shifting element 431 acts on the fixed-pattern optic 430 to shift the pattern spatially by, for example, 90 degrees of the fine pitch pattern. In this manner, the fixed-pattern optic 430 is shifted according to the high frequency cosine function in Equation/expression 750. Expression 750 represents the relationship between base intensity pattern vs. position.

Other shifts are contemplated hereby: Shifting the fixed-pattern optic 430 in increments of 90 degrees is one of a multitude of contemplated embodiments. Shifting the fixed-pattern optic 90 degrees in separate increments—through one full 365 degree rotation—will provide 3-D measurements about targeted surfaces of an Object-under-test 570 in a manner consistent with a four PMP approach.

EXAMPLES

Alternative Useful Structures: Embodiments Depicted in FIGS. 5A-5B, 8-10

The technique and system of the invention are useful in operation to make real-b time calculations of 3-D data measured with a camera from a surface of an object-under-test 570, 570' or area-under-inspection 511, such as a surface within the mouth of a mammal (intra-oral embodiment suggested by FIG. 5B). For example, as depicted by FIG. 5B, real-time measurements (inspections) can be made of bite surfaces of a human tooth 570 looking for areas of decay, cracks, or other abnormality 580. It is contemplated that a multitude of objects and surfaces may be inspected according to the invention. By way of example, the following targeted surfaces are suitable for inspecting and measurements according to the invention: surfaces of a mammalian lung, surfaces located on a mammalian head, e.g., infra-oral (mouth), within the ear (intra-aural), surfaces of a face, and so on. Itemized below, for handy reference, is a list correlating reference numerals to respective components/features/assemblies as depicted throughout FIGS. 5B, 6, 8-10 (see, also, list above itemizing reference numerals to respective feature as shown and labeled in FIGS. 1-5A):

REFERENCE NUMERAL

Component/Feature Description

500 Architecture for taking Object-under-test measurement
511 Area under inspection
550 Measurement module
560 Carrier/housing for measurement module
570 Object-under-test (FIG. 5A general case, FIG. 5B mammalian tooth shape)
580 Defect on object-under-test (FIG. 5A general case, FIG. 5B area of decay)
700 Patterned optic implementation
705 Base pattern intensity versus position profile
710 Profile intensity pattern
750 Equation for base intensity pattern versus position (expression (8))
800 Actuator assembly for carrying out mechanical shifting/reorientation of fixed-pattern optic such as that labeled 430, 830, 930, 1030
900 Second projection system architecture
910 Light source
915 Light output from light source
920 Illumination optical system
921 Illumination system lens element
922 Another illumination system lens element
925 Light output from light source shaped by illumination system
930 Fixed patterned optic
931 Patterned optic shifting element
932 Linear translation element
933 Glass plate
935 Patterned light output
940 Projection optical system
941 Projection system lens element
942 Another projection system lens element
950 Projector power
1000 Third projection system architecture
1010 Light source
1015 Light output from light source
1020 Illumination optical system
1021 Illumination system lens element
1022 Another illumination system lens element
1025 Light output from light source shaped by illumination system
1030 Fixed patterned optic
1031 Patterned optic shifting mirror
1035 Patterned light output
1040 Projection optical system
1041 Projection system lens element
1042 Another projection system lens element
1050 Projector power Measurement module 550 measures an Area-under-inspection 511. The Object-under-test 570 is within an Area-under-inspection 511. As explained elsewhere, FIG. 5A shows a general case, whereas FIG. 5B illustrates an intra-oral embodiment with 570 shaped in the form of a mammalian tooth. The Object-under-test 570 is first illuminated with the Profile intensity pattern 710. Once the camera system (for example as shown is 300), has captured an image of the illuminated Object-under-test 570, the Patterned optic shifting element 431 shifts the pattern spatially by, for example, 90 degrees of the fine pitch pattern although as mentioned, other shifts are contemplated. The shift of 90 degrees will result in an Object-under-test 570 being measured using a four PMP approach.

As explained in detail above, the actuator mechanism 831 depicted as part of the assembly shown at 800 in FIG. 8, produces requisite motion to shift the fixed-patterned optic lens element 830. Mechanical shifting and/or reorientation of the fixed-pattern optic 430 (FIG. 4), 830 (FIG. 8), 930 (FIG. 9), 1030 (FIG. 10) may be accomplished by a variety of suitable actuator means such as that labeled 831. One approach is to use an assembly 800 that combines the patterned optic shifting element 831 (also represented at 431) and the fixed-patterned optic 830 (also represented at 430) as depicted in FIG. 8. Alternatively mechanical shifting/movement or reorientation of the fixed-pattern optic may be accomplished by another approach: a linear drive piezo motor as actuator.

As explained elsewhere, alternative projection system architectures 900 and 1000 are illustrated in FIG. 9 and FIG. 10, respectively. In the implementation of FIG. 9 at 900, a projected pattern from the Patterned optic 931 is shifted on the Object-under-test 570 using a tilted Glass plate 933 that is rotated through a small range of angles about a pivot point by a Linear translation element 932. In alternative projection system architecture 1000 of FIG. 10, projected pattern from the Patterned optic 1031 is shifted on the Object-under-test 570 using a Patterned optic shifting mirror 1031. The mirror rotates through a small range of angles to achieve requisite spatial shifts in the pattern.

While certain representative embodiments and details have been shown for the purpose of illustrating features of the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke 35 U.S.C. §112 ¶6 in a manner that unduly limits rights to its claimed invention. Furthermore, in any claim that is filed herewith or hereafter, any means-plus-function clauses used, or later found to be present, are intended to cover at least all structure(s) described herein as performing the recited function and not only structural equivalents but also equivalent structures.

We claim:

1. A surface measurement module for 3-D triangulation-based image acquisition of a surface-under-inspection and under observation by at least one camera, said module comprising:
    (a) a casing housing an optical system comprising a plurality of lens elements positioned between a fixed-pattern optic and a light source;
    (b) an output of said fixed-pattern optic comprising a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \quad \text{Eq. (1.1)}$$

where $I_n^p$ is an intensity of a pixel for an $n^{th}$ projected image in a particular moment in time; K is an integer representing a number of component sinusoids, each component sinusoid having a distinct temporal frequency, said output comprising at least N projected patterns; a parameter $B_k^p$ represents constants that determine an amplitude or signal strength of said component sinusoids; $A^p$ is a scalar; $f_k$ is a spatial frequency of a $k^{th}$ sinusoid corresponding to a temporal frequency k; and $y^p$ represents a spatial coordinate in an image projected as a result of said output;
    (c) a shifting element to temporally change said output of said fixed-pattern optic during projection onto said surface-under-inspection;
    (d) a plurality of images captured of said output of said fixed-pattern optic during projection onto said surface-under-inspection are used for the image acquisition; and
    (e) wherein said casing also houses said shifting element.

2. A system comprising the module of claim 1 positioned for inspection of a surface selected from the group consisting of: a surface of a mammalian lung, and a surface located on a mammalian head.

3. The surface measurement module of claim 1, wherein said fixed-pattern optic comprises said multi-frequency pattern fixed into a substrate member, such that said output of said fixed-pattern optic results during said projection onto the surface-under-inspection.

4. The surface measurement module of claim 3, wherein said multi-frequency pattern is fixed by incorporating a reflective material into said substrate member, said substrate member selected from the group consisting of glass and silicon.

5. The surface measurement module of claim 3, wherein said multi-frequency pattern is fixed by depositing a material onto said substrate member, said substrate member selected from the group consisting of glass and silicon.

6. The surface measurement module of claim 3, wherein said shifting element comprises a linear translation element.

7. The surface measurement module of claim 3, wherein said shifting element comprises a linear drive piezo motor.

8. A system for implementing 3-D triangulation-based image acquisition of a surface-under-inspection and under observation by at least one camera, the system comprising a surface measurement module comprising:
    (a) a casing housing an optical system comprising a plurality of lens elements positioned between a fixed-pattern optic and a light source;
    (b) an output of said fixed-pattern optic comprising a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \quad \text{Eq. (1.1)}$$

where $I_n^p$ is an intensity of a pixel for an $n^{th}$ projected image in a particular moment in time; K is an integer representing a number of component sinusoids, each component sinusoid having a distinct temporal frequency, said output comprising at least N projected patterns; a parameter $B_k^p$ represents constants that determine an amplitude or signal strength of said component sinusoids; $A^p$ is a scalar; $f_k$ is a spatial frequency of a $k^{th}$ sinusoid corresponding to a temporal frequency k; and $y^p$ represents a spatial coordinate in an image projected as a result of said output;

(c) a shifting element to temporally change said output of said fixed-pattern optic during projection onto said surface-under-inspection;

(d) a plurality of images captured of said output of said fixed-pattern optic during projection onto said surface-under-inspection are used for the image acquisition; and (e) wherein said plurality of images captured are recorded by said at least one camera, and said casing also houses said at least one camera and said shifting element.

9. The system of claim 8, wherein said fixed-pattern optic comprises said multi-frequency pattern fixed into a substrate member, such that said output of said fixed-pattern optic results during said projection onto the surface-under-inspection.

10. The system of claim 8, wherein said multi-frequency pattern is fixed by incorporating a reflective material into said substrate member and the surface-under-inspection comprises a surface selected from the group consisting of: a surface of a mammalian lung, and a surface located on a mammalian head.

11. The system of claim 10, wherein said surface located on a mammalian head comprises a surface found in an area selected from the group consisting of: intra-oral area, an area within the ear, and an area of a face.

12. The surface measurement module of claim 1, wherein said fixed-pattern optic comprises said multi-frequency pattern fixed into a substrate member by incorporating therein a reflective material comprising at least one mirror, such that said output of said fixed-pattern optic results during said projection onto the surface-under-inspection.

13. The surface measurement module of claim 1, wherein said fixed-pattern optic comprises said multi-frequency pattern fixed into a substrate member by depositing a material thereon such that said output of said fixed-pattern optic results during said projection onto the surface-under-inspection.

14. The surface measurement module of claim 1, wherein said shifting element comprises an actuator mechanism having a component selected from the group consisting of: a linear translation element; a silicon beam structure to which a voltage is applied; a rotational shifting element; a linear drive piezo motor; and a shifting mirror.

15. The surface measurement module of claim 14, wherein said component of said actuator mechanism comprises said rotational shifting element which further comprises at least one mirror.

16. The surface measurement module of claim 1, wherein: said shifting element comprises an actuator mechanism operable with said fixed-pattern optic to effect said temporal change of said output of said fixed-pattern optic during projection; said fixed-pattern optic comprises said multi-frequency pattern fixed into a substrate member by incorporating a reflective material therein.

17. The surface measurement module of claim 1, wherein: said fixed-pattern optic comprises said multi-frequency pattern fixed into a semiconductor substrate selected from the group consisting of silicon and glass; and said shifting element comprises an actuator mechanism having a reflective material component.

18. The surface measurement module of claim 17, wherein said shifting element and said fixed-pattern optic are integrated such that said reflective material component comprises at least one mirror incorporated into said semiconductor substrate.

19. A surface measurement module for 3-D triangulation-based image acquisition of a surface-under-inspection and under observation by at least one camera, said module comprising:

(a) a casing housing an optical system comprising a plurality of lens elements positioned between a fixed-pattern optic and a light source;

(b) an output of said fixed-pattern optic comprising a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \qquad \text{Eq. (1.1)}$$

where $I_n^p$ is an intensity of a pixel for an $n^{th}$ projected image in a particular moment in time; K is an integer representing a number of component sinusoids, each component sinusoid having a distinct temporal frequency, said output comprising at least N projected patterns; a parameter $B_k^p$ represents constants that determine an amplitude or signal strength of said component sinusoids; $A^p$ is a scalar; $f_k$ is a spatial frequency of a $k^{th}$ sinusoid corresponding to a temporal frequency k; and $y^p$ represents a spatial coordinate in an image projected as a result of said output;

(c) a shifting element operable with said fixed-pattern optic to temporally change said output of said fixed-pattern optic during projection onto said surface-under-inspection (d) a plurality of images captured of said output of said fixed-pattern optic during projection onto said surface-under-inspection are used by a system controller unit for the image acquisition; and (e) said casing also housing said at least one camera, said shifting element, and said system controller unit.

20. The surface measurement module of claim 19, further comprising: said casing also housing a calibration fixture for pre-calibration for use by said system controller unit to maintain the module within a target operating range.

* * * * *